United States Patent [19]

Washizawa et al.

[11] Patent Number: 5,481,521

[45] Date of Patent: Jan. 2, 1996

[54] INFORMATION RECORDING AND REPRODUCING APPARATUS UTILIZING A TUNNELING CURRENT OR INTERATOMIC FORCES

[75] Inventors: Teruyoshi Washizawa, Atsugi; Kunihiro Sakai, Isehara, both of Japan

[73] Assignee: Canon Kabushiki Kaisha, Tokyo, Japan

[21] Appl. No.: 297,911

[22] Filed: Aug. 31, 1994

[30] Foreign Application Priority Data

Sep. 1, 1993 [JP] Japan .................................. 5-217393
Sep. 21, 1993 [JP] Japan .................................. 5-234581

[51] Int. Cl.$^6$ ............................................ G11B 7/00
[52] U.S. Cl. ........................ 369/99; 369/32; 369/126; 369/101; 250/306
[58] Field of Search .......................... 369/99, 32, 126, 369/13, 101; 250/306, 307

[56] References Cited

U.S. PATENT DOCUMENTS

5,182,724 1/1993 Yanagisawa et al. .................. 369/126
5,255,258 10/1993 Kawade et al. ........................ 369/126
5,331,613 7/1994 Yamada ................................... 369/32

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

An information recording and reproducing apparatus for reproducing information recorded on a recording medium by two-dimensionally scanning the surface of the recording medium with a probe electrode includes a detector to detect data indicative of the surface information of the recording medium by using a physical interaction which occurs between the probe electrode and the recording medium, another detector to detect predicted data to predict the surface information of the recording medium from the data by using predetermined predictive parameters, and a reproducing unit to reproduce the information recorded on the recording medium by using the data and the predicted data, for example, on the basis of the difference between them. The apparatus also has a learning unit to optimize the predictive parameters on the basis of the data and the predicted data.

2 Claims, 6 Drawing Sheets

FIG. 4A BEFORE WRITING PREDICTED BIT

FIG. 4B EXAMPLE OF PREDICTED IMAGE

FIG. 4C ABSOLUTE VALUE OF PREDICTED ERROR

FIG. 6

INFORMATION RECORDING AND REPRODUCING APPARATUS UTILIZING A TUNNELING CURRENT OR INTERATOMIC FORCES

BACKGROUND OF THE INVENTION

1. Field of the Invention

The present invention relates to a recording and/or reproducing apparatus in which while relatively two-dimensionally scanning a probe electrode to a recording medium, information is recorded onto the recording medium and the recorded information is reproduced by using a signal which is caused by a physical interaction between the recording medium and the probe electrode.

2. Related Background Art

In recent years, there has been a tendency to increase the recording capacity of a recording apparatus, to decrease the size of the recording unit and to increase the recording density. For example, in a digital audio disc recorded on using an optical recording, the size of recording unit is set to at most about 1 $\mu m^2$.

On the other hand, in recent years, a scanning tunneling microscope (hereinafter, simply abbreviated to STM) which can directly observe the shape of a surface of a substance and the electronic structure of a portion near the surface has been developed and an application in a wide range is expected because the STM has the following advantages.

1. A real space image can be measured at a high resolution irrespective of a difference between a monocrystal and an amorphous.
2. An image can be observed at a low electric power consumption without damaging a recording medium with a current.
3. The STM can operate not only in a superhigh vacuum but also in the atmosphere and in solution.
4. The STM can be used for various kinds of materials.

The STM uses the phenomenon of a tunnel current flowing between a probe electrode (metal probe) and a conductive material when a voltage is applied therebetween and the probe electrode is made approach the material up to a distance of about 1 nm. The tunnel current is very sensitive to a change in distance between the probe electrode and the conductive material. Therefore, surface information of a real space can be obtained by scanning the probe in the in-plane direction while keeping the tunnel current or the average distance between them constant. In this instance, the resolution in the in-plane direction is equal to 10 nm or less.

By applying the principle of the STM and by using a thin film layer or the like of a material having a memory effect for the switching characteristics of the voltage to current, for example, a π electron system organic compound or chalcogen compound class as a recording medium, information can be recorded on a recording unit basis of 0.01 $\mu m^2$ or less.

On the other hand, by using a method of changing the surface shape state of the medium by using an electromagnetic wave such as electron beam, light, or the like, although the recording unit increases because of a limitation of the convergence degree of the beam, information can be recorded and reproduced at a recording density that is almost equal to that in the present optical recording.

In the above conventional recording and reproducing apparatus using the principle of the STM mentioned above, however, in case of recording and reproducing information at a high density over the surface (recording surface) of the recording medium having a predetermined area, the S/N ratio, the error rate, or the like of the signal upon reproduction deteriorates due to concave and convex portions which are not concerned with the recording information existing on the recording surface. Such deterioration is a significant obstacle to developing a high density recording capacity.

SUMMARY OF THE INVENTION

The present invention is made in consideration of the problems of the conventional techniques as mentioned above and it is an object of the invention to provide an information recording and reproducing apparatus which can efficiently extract only recording information from information which was influenced by concave and convex portions which are not concerned with recording information existing on the surface of a recording medium.

The above object is accomplished by an information recording and reproducing apparatus for reproducing information recorded on a recording medium by two-dimensionally scanning the surface of the recording medium with a probe, comprising: means for detecting data indicative of surface information of the recording medium by using a physical interaction which occurs between the probe and the recording medium; means for detecting predictive data to predict the surface information of the recording medium from the data by using predetermined predictive parameters; and means for reproducing the information recorded on the recording medium by using the data and the predicted data.

DETAILED DESCRIPTION OF THE PREFERRED EMBODIMENTS

Figure 1:
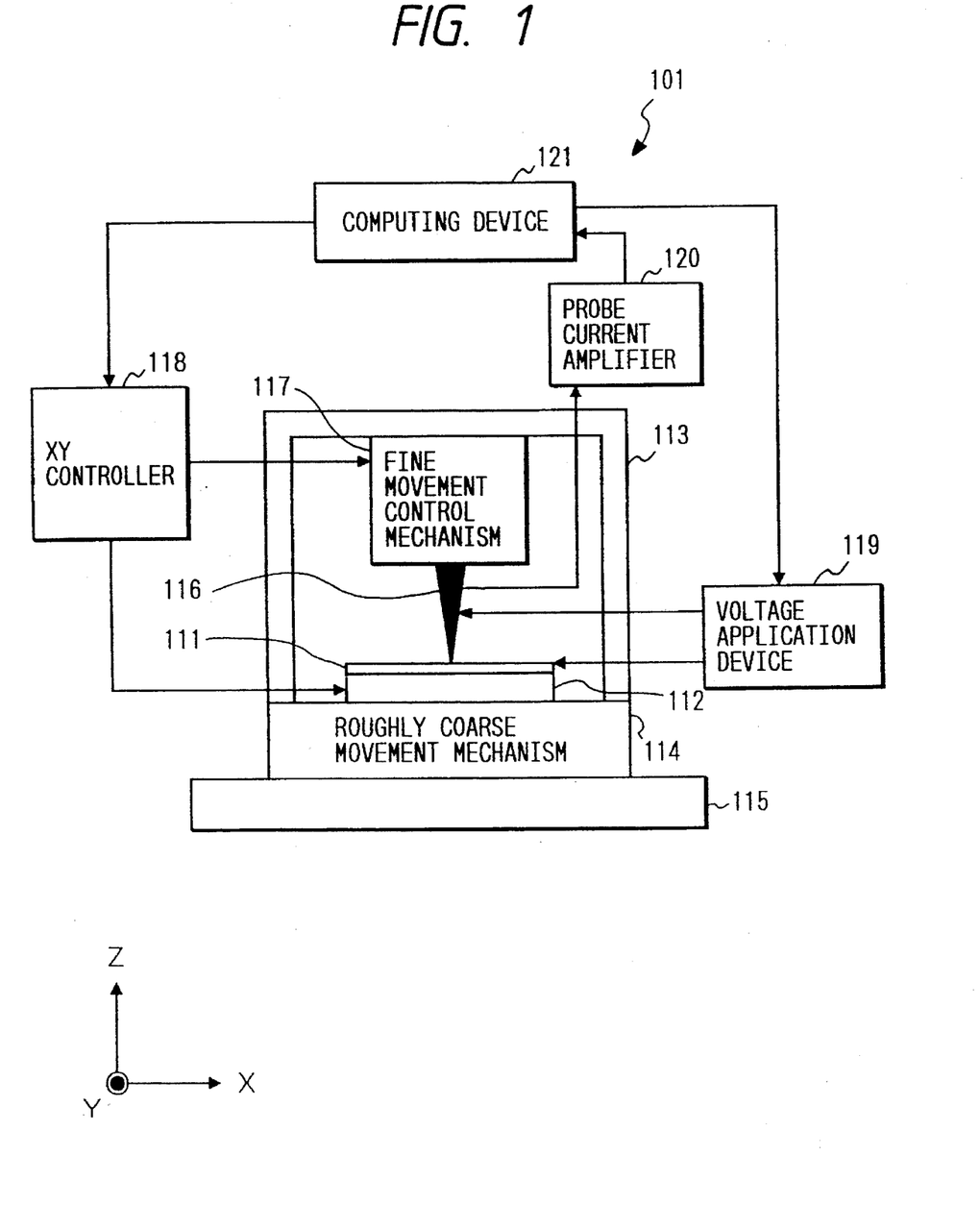
FIG. 1 is a block diagram showing the construction of an information recording and reproducing apparatus of an embodiment of the invention.

An embodiment of the present invention will now be described hereinbelow with reference to the drawings. FIG. 1 is a block diagram showing a construction of an information recording and reproducing apparatus according to an embodiment of the invention.

The main body of an information recording and reproducing apparatus 101 of the invention comprises: a structure 113 for supporting a fine movement control mechanism 117 to finely move a probe electrode 116 and a coarse movement control mechanism 112 to coarsely move a recording medium 111; a roughly coarse movement mechanism 114 on which the structure 111 is mounted; and a vibration preventing base 115 on which the roughly coarse movement control mechanism 114 is mounted.

The structure 113 is made of an invar alloy for supporting each of the structure portions. The coarse movement control mechanism 112 is attached to the bottom surface of the structure 113. The recording medium 111 is mounted on the coarse movement control mechanism 112. The recording medium 111 is a medium on which information is actually written and is formed by laminating eight layers made of squalillium-bis-6-octylazulene having a memory effect for the switching characteristics of the current to voltage onto a graphite substrate by using a Langmuir-Blodgett's technique (LB technique). In the initial state, the recording medium 111 is in a non-recording state (off state). The coarse movement control mechanism 112 has a parallel spring using an elastic hinge and is used to perform a coarse movement control of the recording medium 111 in the X-axis and Y-axis directions shown in the diagram. The fine movement control mechanism 117 is attached to the upper surface inside of the structure 113 so that the probe electrode 116 faces the recording medium 111. The probe electrode 116 is used to record and reproduce information. As a probe electrode 116, a tungsten stylus whose tip was mechanically ground and was electrolytically polished is used in order to improve the resolution of the recording and reproduction. However, Pt-Ir, Pt, or the like can be also used as a material of the probe electrode 116. A treating method is also not limited to the above method. The fine movement control mechanism 117 comprises a cylindrical piezoelectric element and is used to move the probe electrode 116 in the in-plane direction (X, Y direction) of the recording medium 111 and in the direction (Z direction) between the recording medium 111 and the probe electrode 116. In an ordinary operation of the device, the interval between the tip of the probe electrode 116 and the surface of the recording medium 111 is set to a value such that a tunnel current flows.

The roughly coarse movement mechanism 114 controls a range of movement outside the control ranges of the fine movement control mechanism 117 and the coarse movement control mechanism 112. The vibration preventing base 115 is used to prevent propagation of outside vibration to the information recording and reproducing apparatus 101 and to prevent the erroneous operation of the information recording and reproducing apparatus 101 due to the outside vibration.

An electrical and control system of the information recording and reproducing apparatus 101 comprises a voltage application device 119, a probe current amplifier 120, a computing device 121, and an XY controller 118.

The voltage application device 119 provides a bias voltage for recording, reproducing, and erasing information to/from the recording medium 111 to a portion between the probe electrode 116 and the recording medium 111 by an arbitrary level in a range from −10 V to +10 V.

The probe current amplifier 120 is connected to the probe electrode 116 and detects a tunnel current flowing in the probe electrode 116 by the bias voltage and converts the detected tunnel current into a voltage signal and amplifies and outputs the amplified signal to the computing device 121.

The XY controller 118 controls the fine movement control mechanism 117 and the coarse movement control mechanism 112 and arbitrarily effects relative movement between the probe electrode 116 and the recording medium 111.

The computing device 121 inputs an output signal of the probe current amplifier 120 and controls the voltage application device 119 and the XY controller 118. The computing device 121 comprises: a microprocessor for respectively controlling the XY controller 118 and the voltage application device 119; an A/D converter for converting a voltage signal which is sent from the probe current amplifier 120 into a digital signal, thereby quantizing it and an image processing device for storing a reproduction image in which the tunnel current as a digital signal or the voltage applied to the fine movement control mechanism 117 through the XY controller 118 for moving the probe electrode 116 in the Z direction is set to a pixel value and for extracting only a recording bit region from the reproduction image.

In the information recording and reproducing apparatus of the invention, in addition to the ordinary operation of the STM, the probe electrode 116 is moved to an arbitrary position in a space over the recording medium 111 and even in a state in which a feedback is performed or a state in which the feedback is cut off, a bias voltage of an arbitrary level in a range from −10 V to +10 V can be applied.

Although the actual recording and reproducing operations of the information recording and reproducing apparatus 101 of the invention are not described in detail here, the recording to the recording medium 111 is performed by applying a voltage of +10 V larger than a threshold value of a voltage at which the memory effect of the recording medium 111 appears to the recording medium 111 as a recording voltage. After the recording voltage is applied, the region in which the memory effect occurred appears as a convex image in case of performing the reproduction with a bias voltage lower than the threshold value in, for example, a constant current mode in the STM, so that such a region can be made to correspond to recording bit "1" of recording information ("1" or "0").

In the information recording and reproducing apparatus 101 of the invention, as mentioned above, the image processing device is assembled in the computing device 121. Although the recording bit as a minimum unit of the recording information appears on the image as a convex region as mentioned above, in the actual image, influences of the concave and convex portions (i.e. surface roughness) of the recording medium surface have been multiplexed. According to the image processing device, in the reproduction image which is obtained from the change amount of the tunnel current value or the displacement amount in the Z direction of the probe electrode 116, in order to avoid the influences of the concave and convex portions of the recording medium surface, the recording information is extracted by a method different from the general binarization by the threshold value logic and a recording bit region image (binary image) in which the recording information is used as a pixel value is generated.

Figure 2:
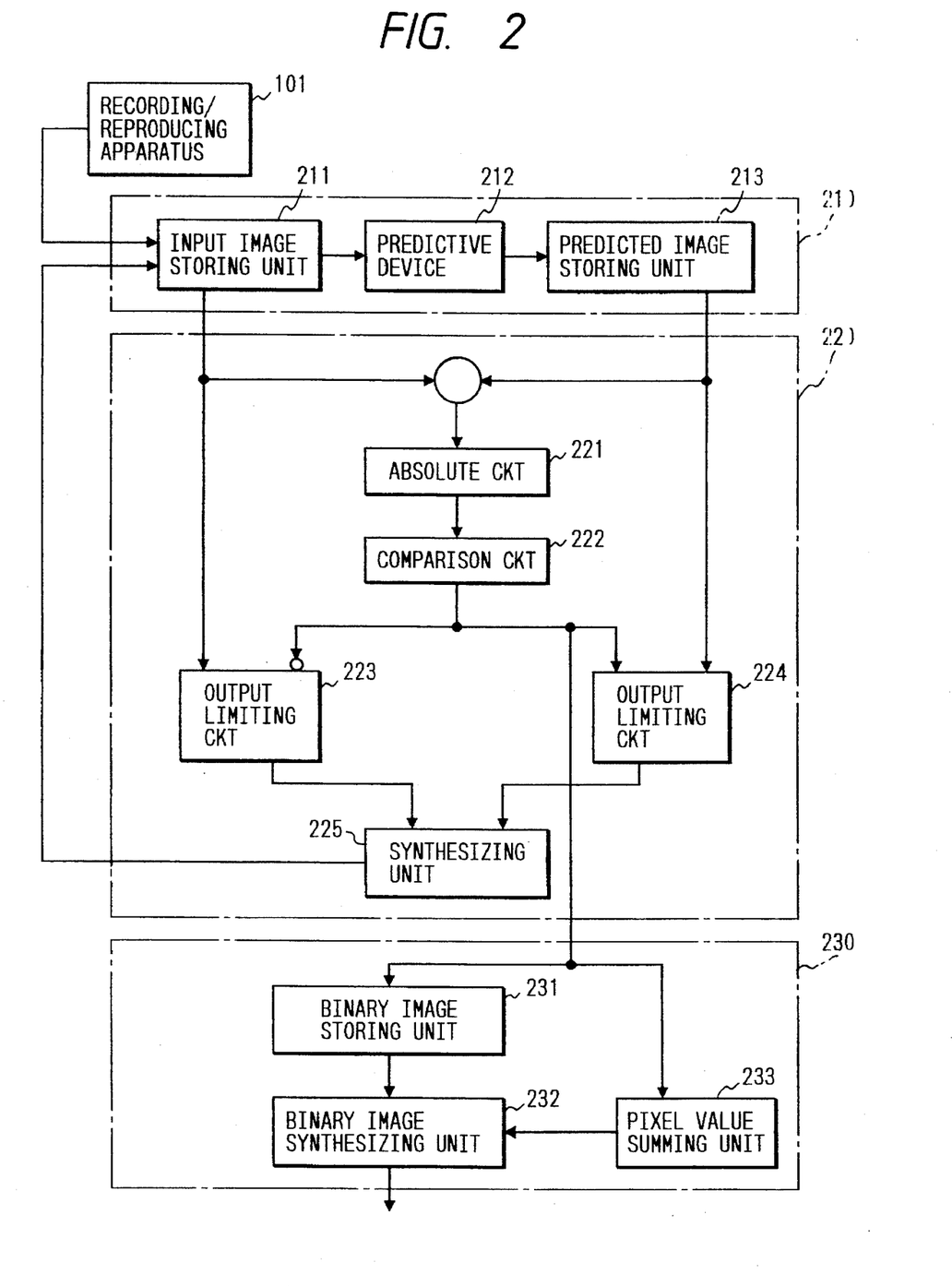
FIG. 2 is a block diagram showing the construction of an image processing apparatus included in a computing device in FIG. 1.

FIG. 2 is a block diagram showing a construction of the image processing device included in the computing device 121.

Figure 3:
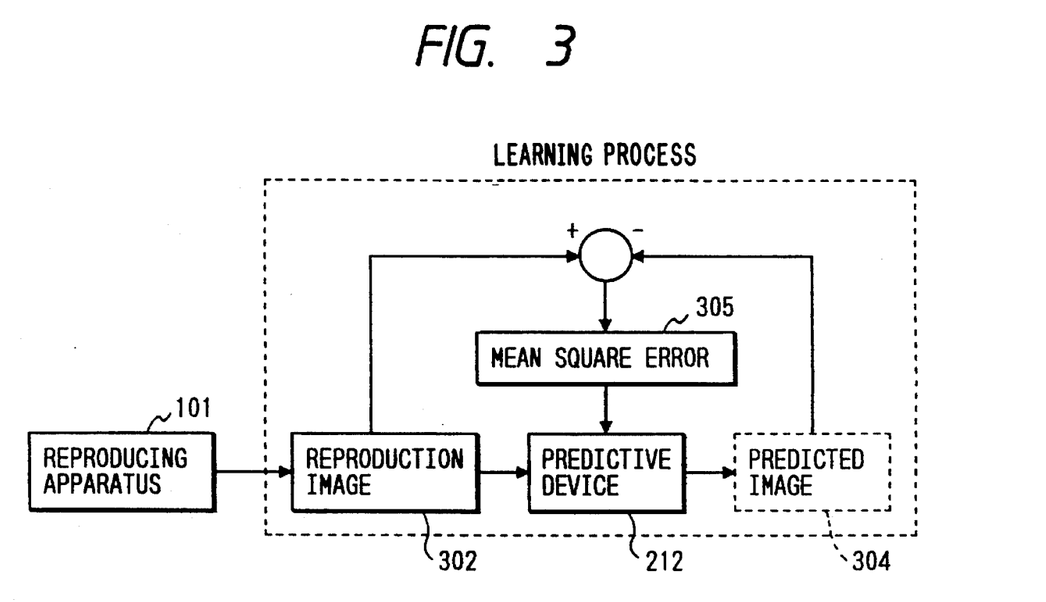
FIG. 3 is a principle diagram showing a learning process of a predictive device in FIG. 2.
Figure 4A:
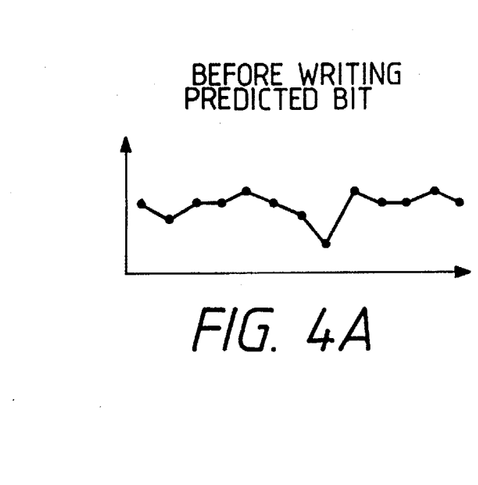
FIGS. 4A to 4C are diagrams showing an embodiment of the learning process.
Figure 4B:
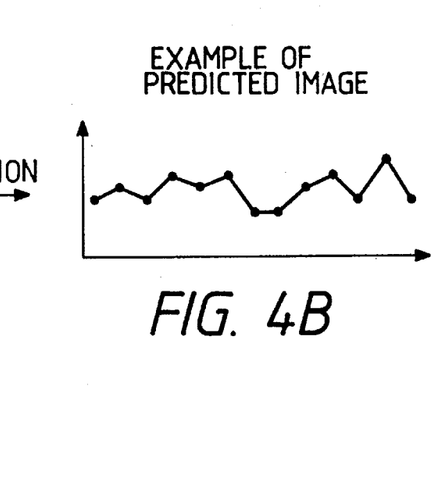
Figure 4C:
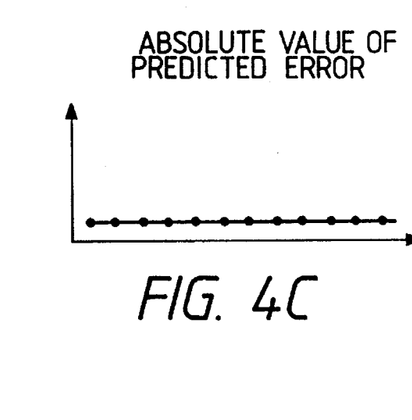

A predictive device 212 which is used in the image processing device predicts the value of each pixel of a two-dimensional image from the values of the pixels near the target pixel and has a learning function for performing the adjustment of predictive parameters from the comparison between the input image which is input and the predicted image which is predicted from the input image. The predictive device 212 will be first described. FIG. 3 is a principle diagram showing a learning process of the predictive device 212. FIGS. 4A to 4C are diagrams showing an embodiment of the learning process.

Since the learning process is provided to learn concave and convex portions of the surface of the recording medium 111, it is necessary that no recording bit is written. The learning process is executed in the following manner upon shipping by using the surface in a range in which the scan of the fine movement control mechanism 117 is executed.

In the learning process, a reproduction image 302 (however, it is an image of the surface in the non-recording state upon shipping as mentioned above; for example, image shown in FIG. 4A) obtained from the information recording and reproducing apparatus 101 is input to the predictive device 212. For example, so long as the predictive device 212 is constructed by an adaptive AR model, the predictive parameters to be adjusted are linear coefficients and their adjusting method is accomplished by the steepest descent method based on a mean square error 305 of the reproduction image 302 and a predicted image 304. If the predictive device is constructed by a neural network, the predictive parameters to be adjusted are connection coefficients (weights) between units and threshold values of units and their adjusting method is also accomplished by the steepest descent method based on the mean square error 305 of the reproduction image 302 and the predicted image 304. By performing such a learning process, the predictive device 212 can output a predicted image shown in FIG. 4B for the input image shown in FIG. 4A. It is possible to expect such that an absolute value of the difference of those pixels lies within a certain range.

The image processing device comprises: an input image storing unit 211; a predictive unit 210 which is constructed by the predictive device 212 and a predicted image storing unit 213; a pixel processing unit 220 which is constructed by an absolute circuit 221, a comparison circuit 222, output limiting circuits 223 and 224, and a synthesizing unit 225; and an image reconstructing unit 230 which is constructed by a binary image storing unit 231, a binary image synthesizing unit 232, and a pixel value summing unit 233.

The input image storing unit 211 once stores the reproduction image from the information recording and reproducing apparatus 101 or the synthesized image which is input from the pixel processing unit 220 as will be explained hereinlater as an input image which is output to the predictive device 212. The input image storing unit 211 sequentially outputs the values of the pixels constructing the input image to the absolute circuit 221 and output limiting circuit 223 of the pixel processing unit 220. The predictive device 212 supplies the predicted image which was predicted from the input image as mentioned above to the predicted image storing unit 213. The predicted image storing unit 213 once stores the predicted image which was predicted by the predictive device 212 and sequentially supplies the values of the pixels constructing the predicted image to the absolute circuit 221 and the output limiting circuit 224 of the pixel processing unit.

The absolute circuit 221 obtains a difference between each pixel of the input image from the input image storing unit 211 and the value of each pixel of the predicted image from the predicted image storing unit 213, namely, a predicted error and supplies the absolute value of the predicted error to the comparison circuit 222. The comparison circuit 222 compares the absolute value of the differential data as an output of the absolute circuit 221 with a predetermined threshold value. When the absolute value of the differential data is larger than the threshold value, the comparison circuit 222 outputs "1" to the output limiting circuits 223 and 224 and the binary image storing unit 231 and pixel value summing unit 233 of the image reconstructing unit 230. When the absolute value is smaller than the threshold value, "0" is output. Each of the output limiting circuits 223 and 224 has three terminals comprising an input terminal, an output terminal, and an output limiting terminal. When the input of the output limiting terminal is equal to "1", the input signal of the input terminal is output as it is from the output terminal. When the input of the output limiting terminal is equal to "0", "0" is output from the output terminal irrespective of the value of the input. The output limiting circuit 223 inputs the value of each pixel of the input image from the input image storing unit 211 to the input terminal. The output limiting circuit 223 inverts the binary output of the comparison circuit 222 and inputs the inverted output signal to the output limiting terminal and supplies the value of each pixel whose output was limited to the synthesizing unit 225. The output limiting circuit 224 inputs the value of each pixel of the predicted image from the predicted image storing unit 213 to the input terminal and inputs the binary output of the comparison circuit 222 as it is to the output limiting terminal and supplies the value of each pixel whose output was limited to the synthesizing unit 225. The synthesizing unit 225 adds the pixel values of the outputs of the output limiting circuits 223 and 224 and supplies the added value to the input image storing unit 211 of the predictive unit 210. Therefore, this output forms the input image or a synthetic image comprising the pixels of the predicted image in the input image storing unit 211.

The binary image storing unit 231 stores the binary output of the comparison circuit 222 until one image is constructed and outputs the binary output to the binary image synthesizing unit 232 at a proper reading speed. Each pixel value of the binary image which is stored in the binary image storing unit 231 is updated to a pixel value which is newly input for every image. The pixel value summing unit 233 calculates the number of pixels of "1" included in one image when the binary output of the comparison circuit 222 forms one image. When the number of pixels of "1" is equal to 0, the pixel value summing unit 233 generates an output start signal to the binary image synthesizing unit 232. The input of the binary image synthesizing unit 232 is the binary output of the binary image storing unit 231. The binary image synthesizing unit 232 stores the binary image in which the value of each pixel is updated to the value obtained by the logical-OR of the input pixel value and the value which has already been stored in the unit 232. When receiving the output start signal from the pixel value summing unit 233, the stored binary image is generated as a recording bit region image as a final output image.

The operation of the image processing device will now be described.

The predictive device 212 outputs the predicted image for the input image on the basis of the predictive parameters which were adjusted as mentioned above. As for the input image of the predictive device 212, the reproduction image from the information recording and reproducing apparatus 101 is given as an initial value.

The absolute value of the difference (differential data) between the input image and the predicted image is calculated by the absolute circuit 221 for every pixel. The comparison circuit 222 compares the absolute value of the differential data and the threshold value. Therefore, the output of the comparison circuit 222 becomes the binary image such that the pixel in which the absolute value of the differential data is larger than the threshold value is equal to "1" in the binary image storing unit 231.

Although the output of the comparison circuit 222 is supplied to the output limiting terminals of the output limiting circuits 223 and 224, since the output limiting terminal of the output limiting circuit 223 is set to the inverting input, when the output of the comparison circuit 222 is equal to "1", the pixel of the predicted image is supplied to the synthesizing unit 225. When the output of the comparison circuit 222 is equal to "0", the pixel of the input image is output to the synthesizing unit 225. Therefore, the synthetic image in the input image storing unit 211 becomes the input image such that the pixel in which the absolute value of the differential data is larger than the threshold value was replaced by the pixel of the predicted image. The predictive unit 210 and the pixel processing unit 220 form the predicted image and the synthetic image by using the synthetic image as a new input image.

Although the binary image is sent to the image reconstructing unit 230 each time the predictive device 212 generates the predicted image, the logical-OR of the binary images is calculated in the binary image synthesizing unit 232 and the sum of the pixel values is calculated in the pixel value summing unit 233. When all of the pixel values of the binary image are equal to "0", by receiving the output start signal from the pixel value summing unit 233, the binary image synthesizing unit 232 finally outputs the binary image from which the logical-OR was obtained as a recording bit region image.

Figure 5A:
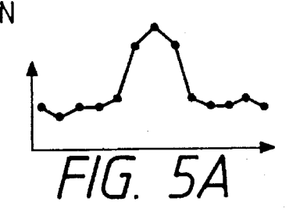
FIGS. 5A to 5M are diagrams showing specific examples of the operation of the image processing apparatus.
Figure 5B:
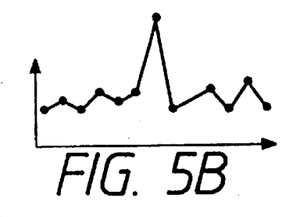
Figure 5C:
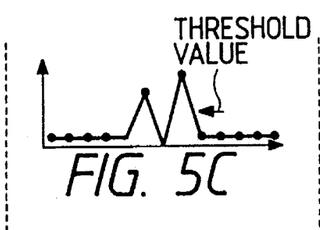
Figure 5D:
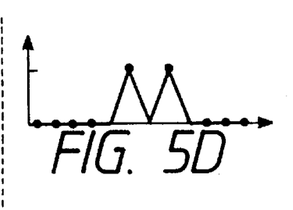
Figure 5E:
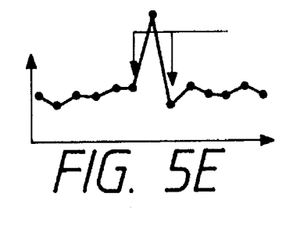
Figure 5F:
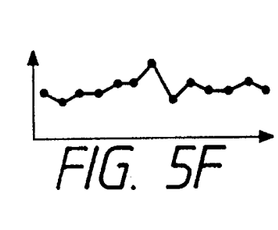
Figure 5G:
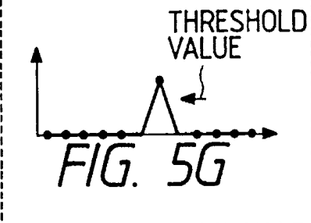
Figure 5H:
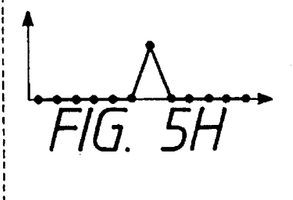
Figure 5I:
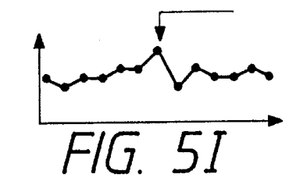
Figure 5J:
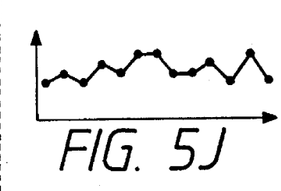
Figure 5K:
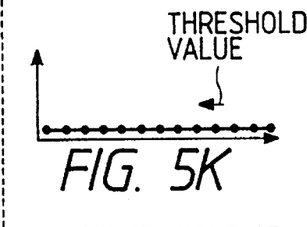
Figure 5L:
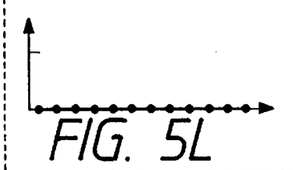
Figure 5M:
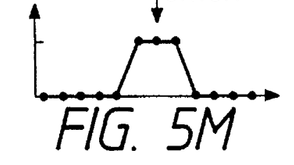

FIGS. 5A to 5M show specific examples of the operation of the device. For simplicity, it is assumed that a reproduction image shown in FIG. 5A is one-dimensional data. For the reproduction image shown in FIG. 5A, the predictive device 212 generates a predicted image as shown in FIG. 5B. An image shown in FIG. 5C is formed from the absolute values of those differential data. On the basis of the image of FIG. 5C, the comparison circuit 222 forms a binary image shown in FIG. 5D by the threshold value. The output limiting circuits 223 and 224 and the synthesizing unit 225 synthesize a synthetic image shown in FIG. 5E. The synthetic image shown in FIG. 5E is obtained by replacing the pixel in which the value of the pixel of the binary image shown in FIG. 5D corresponding to the pixel of the reproduction image shown in FIG. 5A is equal to "1" with the pixel of the predicted image shown in FIG. 5B. The synthetic image shown in FIG. 5E which was synthesized as mentioned above is used as an input image and the above process is again executed, thereby obtaining a binary image shown in FIG. 5H and a synthetic image shown in FIG. 5I. The binary image shown in FIG. 5H is used as an input image and the above process is again performed, thereby obtaining a binary image shown in FIG. 5L. Since the values of the pixels of the binary image are equal to "0", the synthetic image and binary image which are also obtained by again executing the above process are equal to the synthetic image shown in FIG. 5I and the binary image shown in FIG. 5L. The binary image synthesizing unit 232 calculates the logical-OR of the values of the pixels of the binary images shown in FIGS. 5D and 5H obtained as mentioned above, thereby forming a binary image shown in FIG. 5M. The image processing device generates the binary image which is finally obtained and is shown in FIG. 5M as a recording bit region image.

In the above embodiment, the learning process has been executed upon shipping. However, there is also considered a method whereby in order to accurately predict even when the surface state of the recording medium 111 changes with the elapse of time after shipping, the learning process is successively performed and the predictive parameters are updated. It is necessary to perform the updating of the predictive parameters by using a region in which the recording bits of the recording medium 111 are not written when the information recording and reproducing apparatus 101 doesn't execute the recording or reproducing operation, for example, before the recording or reproducing operation is executed by turning on the power source of the information recording and reproducing apparatus 101 or after completion of the recording or reproducing operation before turning off the power source of the information recording and reproducing apparatus 101 or the like.

For this purpose, a scan control unit is newly provided for the computing device 121 and a learning control unit is newly provided for the predictive unit 210 of the image processing device. The scan control unit is used to obtain a reproduction image by, for example, automatically scanning the probe electrode 116 on an arbitrary region of the recording medium 111 after the turn-on of the power source when the information recording and reproducing apparatus is in a predetermined state. The learning control unit operates interlockingly with the scan control unit and controls the learning function of the predictive device 212 in the following manner on the basis of the reproduction image derived by the scan control unit.

The reproduction image of the region on the surface of the recording medium 111 selected at random by the scan control unit is sequentially sent to the image processing device. Although the image processing device performs the above process, in this instance, the learning control unit monitors the output of the absolute circuit 221, namely, a difference between the pixel value of the reproduction image and the pixel value of the predicted image. After confirming that the difference is smaller than the preset value, namely, no recording bit exists in the region, the learning control unit allows the predictive device 212 to execute the learning process by using the pixel values from which the difference was derived and the pixel values around the target pixel.

In the embodiment described above, the information recording and reproducing apparatus has been described as an STM which detects the tunnel current occurring between the probe and the recording medium. However, the construction as a feature of the invention is not limited to such an embodiment but the invention can be also applied to an atomic force microscope (AFM) which detects an interatomic force between the probe and the recording medium.

Another embodiment of the invention will now be described.

Since only the construction of an image processing device of another embodiment differs from that of the foregoing embodiment, the description of the other construction is omitted here.

Figure 6:
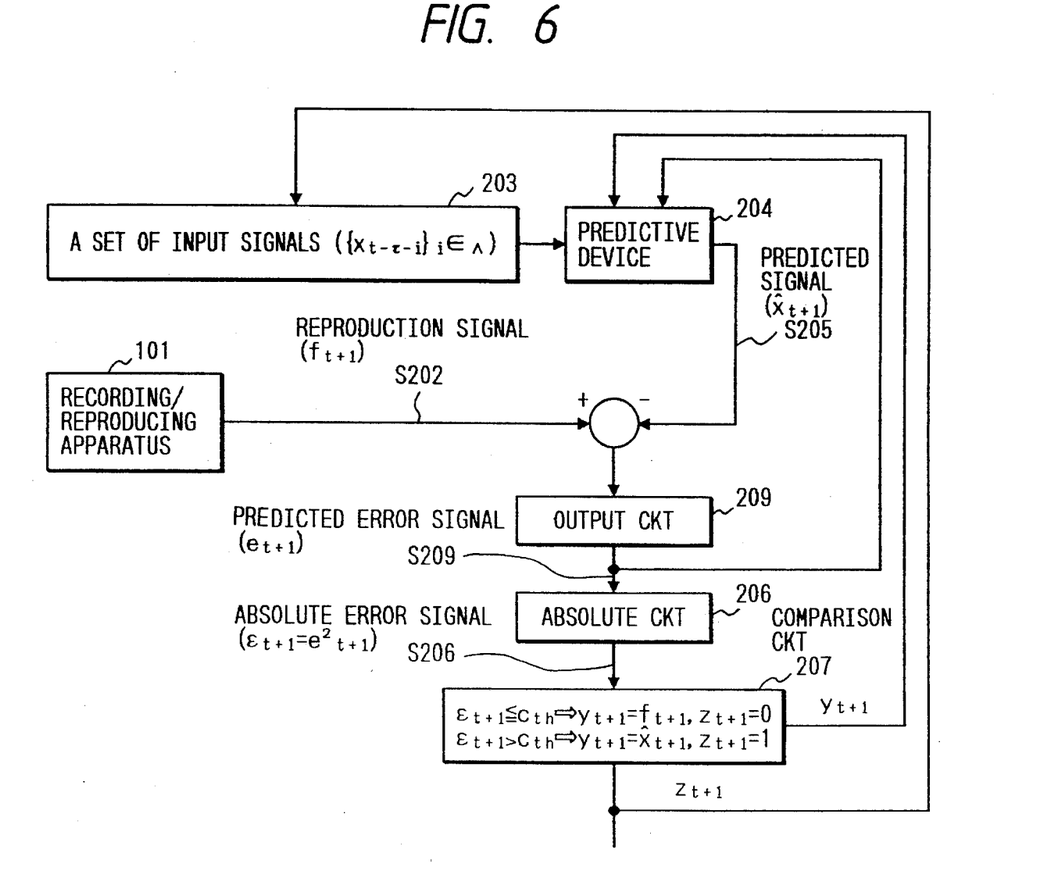
FIG. 6 is a block diagram showing a construction of a signal processing apparatus in an information recording and reproducing apparatus of another embodiment of the invention.

FIG. 6 is a diagram showing a construction of a signal processing device which is used in place of the image processing circuit in FIG. 2.

When the probe electrode is relatively two-dimensionally scanned onto the recording surface of the recording medium, the information recording and reproducing apparatus 101 generates a signal which occurs between the probe electrode and the recording medium by a physical interaction as a time-sequential reproduction signal S202 which indicates the information on the surface of the recording medium and is expressed by $f_t$ or $f_{t+1}$.

A predicted error signal S209 ($e_{t+1}$) as a difference between the reproduction signal S202 ($f_{t+1}$) obtained by scanning the recording medium surface on which no recording bit is recorded and a predicted signal S205

$$\hat{x}_{t+1}$$

which was predicted on the basis of a set of input signals 203 is supplied from an output circuit 209 to a predictive device 204 and an absolute circuit 206. The predictive device 204 has the function of adjusting the predictive parameters on the basis of the prediction error signal S209 ($e_{t+1}$) and an output value $Y_t$ of a comparison circuit 207, which will be explained hereinlater. The absolute circuit 206 produces an absolute error signal S206 which is obtained by squaring the prediction error and supplies it to the comparison circuit 207.

Since the predictive device 204 doesn't have sufficient predicting power in the initial learning process, the comparison circuit 207 always outputs the reproduction signal S202. Namely, it is assumed that $$Y_t = f_t \forall t$$

For example, if the predictive device 204 is constructed by an adaptive AR model, the predictive parameters to be adjusted are a set of linear coefficients and its adjusting method is accomplished by the steepest descent method based on the absolute error signal S206

$$\epsilon_t = (\hat{X}_t - f_t)^2$$

as a square error between the reproduction signal S202 ($f_t$) and the predicted signal S205

$$\hat{X}_t$$

On the other hand, if the predictive device 204 is constructed by a neural network, the predictive parameters to be adjusted is a set of coupling coefficients (weights) between the units and threshold values of units. Its adjusting method is also accomplished by the steepest descent method based on the absolute error signal S206

$$\epsilon_t = (\hat{X}_t - f_t)^2$$

as a square error between the reproduction signal S202 ($f_t$) and the predicted signal S205

$$\hat{X}_t$$

By performing the learning process as mentioned above, the predictive device 204 can output the predicted signal S205 for the set of input signals 203. Now, assuming that the time delay caused by the operations of 209, 206 and 207 is set to τ, the predictive device 204 predicts the signal S205

$$\hat{X}_{t+1}$$

from the set of input signals 203 which is expressed by $$\{X_{t-\tau-i}\} i \in \Lambda$$

The predictive device 204 outputs the predicted signal S205 for the set of input signals 203 on the basis of the predictive parameters adjusted as mentioned above. The comparison circuit 207 outputs two kinds of output values of $Y_{z+1}$ and $z_{t+1}$. Those output values are decided by the following procedures, respectively.

$$\epsilon_{t+1} \leq C_{th} \rightarrow Y_{t+1} = f_{t+1}, Z_{t+1} = 0 \quad (1)$$

$$\epsilon_{t+1} > C_{th} \rightarrow Y_{t+1} = X_{t+1}, Z_{t+1} = 1 \quad (2)$$

where $\epsilon_{t+1}$ denotes the square of the prediction error at time t+1 and $C_{th}$ indicates a proper threshold value.

$$\hat{X}_{t+1}$$

denotes a predicted signal at time t+1. The output value $Y_{t+1}$ of the comparison circuit 207 is sent as an input signal to the set of input signals 203 and is used for the subsequent prediction. The predicted error signal S209 ($et_{+1}$) and the output of the comparison circuit are used to adjust the predictive parameters. That is, only when $Z_{t+1} = 0$, the predictive parameters are adjusted on the basis of the square of the predicted error. The output value $z_{t+1}$ of the comparison circuit 207 is an output corresponding to the discrimination result regarding whether there is a recording bit ($z_{t+1}=1$) or not ($z_{t+1}=0$).

What is claimed is:

1. An information recording and reproducing apparatus for reproducing a recording bit recorded on a surface of a recording medium by two-dimensionally scanning the surface of the recording medium with a probe, comprising:

first detecting means for detecting first data indicative of the state of the surface of the recording medium utilizing a tunneling current or an interatomic force between the probe and the recording medium after recording of the recording bit and after scanning the surface of the recording medium;

second detecting means for detecting second data indicative of the state of the surface of the recording medium before recording of the recording bit or in a region not containing the recording bit and for predicting predicted data indicative of the surface of the recording medium on which the recording bit is not present by using predetermined predictive parameters; and means for reproducing the recording bit recorded on the recording medium on the basis of the difference between the first data and the predicted data.

2. An apparatus according to claim 1, further comprising learning means for optimizing the predictive parameters, wherein said learning means optimizes the predictive parameters on the basis of the second data indicative of the state of the surface of the recording medium prior to formation of the recording bit or in a region of the recording medium on which the recording bit is not formed, and the predicted data.

* * * * *

UNITED STATES PATENT AND TRADEMARK OFFICE
CERTIFICATE OF CORRECTION

PATENT NO. : 5,481,521
DATED : January 2, 1996
INVENTOR(S) : TERUYOSHI WASHIZAWA, et al.

It is certified that error appears in the above-indentified patent and that said Letters Patent is hereby corrected as shown below:

COLUMN 1

Line 32, "an amorphous" should read --an amorphous material--.
Line 43, "approach" should read --to approach--.

COLUMN 4

Line 2, "it" should read --it;--.

COLUMN 9

Line 11, "$Y_t = f_t Vt$" should read --$y_t = f_t \forall_t$--.
Line 28, "is" should read --are--.

UNITED STATES PATENT AND TRADEMARK OFFICE
CERTIFICATE OF CORRECTION

PATENT NO. : 5,481,521

DATED : January 2, 1996

INVENTOR(S) : TERUYOSHI WASHIZAWA, et al.

It is certified that error appears in the above-indentified patent and that said Letters Patent is hereby corrected as shown below:

COLUMN 10

Line 3, "$X_{t+1}, Z_{t+1} = 1$" should read --$\hat{X}_{t+1}, Z_{t+1} = 1$--.

Signed and Sealed this

Seventh Day of May, 1996

Attest:

BRUCE LEHMAN

*Attesting Officer*  *Commissioner of Patents and Trademarks*